(12) United States Patent
Crowley et al.

(10) Patent No.: US 6,379,789 B1
(45) Date of Patent: Apr. 30, 2002

(54) THERMALLY-SPRAYED COMPOSITE SELECTIVE EMITTER

(75) Inventors: Christopher J. Crowley, Orford; Nabil A. Elkouh, Meriden; Patrick J. Magari, Plainfield, all of NH (US)

(73) Assignee: Creare Inc., Hanover, NH (US)

( * ) Notice: Subject to any disclaimer, the term of this patent is extended or adjusted under 35 U.S.C. 154(b) by 0 days.

(21) Appl. No.: 09/678,904

(22) Filed: Oct. 4, 2000

(51) Int. Cl.$^7$ ........................ B32B 18/00; H01L 31/058
(52) U.S. Cl. ........................ 428/336; 428/688; 428/697; 428/698; 428/699; 428/701; 427/446; 427/453; 427/454; 427/456; 136/253; 431/100
(58) Field of Search .................... 136/253; 428/688, 428/697, 698, 699, 701, 336; 427/446, 453, 454, 456; 431/100

(56) References Cited

U.S. PATENT DOCUMENTS

| | | | |
|---|---|---|---|
| 4,554,482 A | 11/1985 | Kamegaya et al. | 313/582 |
| 5,080,724 A * | 1/1992 | Chubb | 136/253 |
| 5,356,487 A | 10/1994 | Goldstein et al. | 136/253 |
| 5,400,765 A | 3/1995 | Goldstein et al. | 126/39 |
| 5,447,786 A | 9/1995 | Rose et al. | 428/229 |
| 5,630,974 A | 5/1997 | Rose et al. | 264/105 |
| 5,747,918 A | 5/1998 | Eom et al. | 313/309 |
| 5,780,370 A | 7/1998 | Chen et al. | 442/414 |
| 5,837,011 A | 11/1998 | Wong | 8/181 |
| 5,865,906 A | 2/1999 | Ferguson et al. | 136/253 |
| 5,879,473 A | 3/1999 | Sarraf | 136/253 |
| 6,091,018 A * | 7/2000 | Fraas et al. | 136/253 |
| 6,177,628 B1 * | 1/2001 | Fraas et al. | 136/253 |
| 6,271,461 B1 * | 8/2001 | Fraas et al. | 136/253 |

OTHER PUBLICATIONS

Cockeram et al, "The development and testing of emissivity enhancement coatings for themophotovoltaic (TPV) radiator applications," Thin Solid Films, vol. 355–356, pp. 17–25, Nov. 1, 1999.*

Yugami et al, "Solar thermophotovoltaic using AL2O3/Er3AL5O12 eutectic composite selective emitter," Photovoltaic Specialists Conference, Conference Record of the 28th IEEE, pp. 1214–1217, Sep. 15–22, 2000.*

* cited by examiner

*Primary Examiner*—Alan Diamond
(74) *Attorney, Agent, or Firm*—Downs Rachlin Martin PLLC (57) ABSTRACT

A composite emitter (100) for a thermophotovoltaic cell and other applications, and a method of forming the composite emitter. The composite emitter includes a substrate (102) and a selective emitter layer (104) composed of at least one substantially pure ceramic oxide selective emitter material applied to the substrate using a thermal spraying method. The substrate is preferably made of a durable material such as a silicon-based material or a refractory metal oxide. In one embodiment, the selective emitter layer may be composed of two or more selective emitter materials. In another embodiment, the composite emitter may further include a reflective metal layer (106). The method includes providing a substrate and plasma spraying one or more selective emitter materials onto the substrate to a thickness of between about 10 microns and about 400 microns to form the selective emitter layer. Preferably, the selective emitter layer has an in situ density of between 80% and 95% of the bulk density of the selective emitter material used.

42 Claims, 3 Drawing Sheets

THERMALLY-SPRAYED COMPOSITE SELECTIVE EMITTER

This invention was made with Government support under contracts NAS3-27829 and NAS3-97018 awarded by NASA. The Government has certain rights in the invention.

FIELD OF THE INVENTION

The present invention relates to structures including one or more materials having high emissivity across a narrow band of wavelengths within a desired energy band. More particularly, the invention is a composite emitter having a layer composed of a thermally sprayed ceramic oxide selective emitter material.

BACKGROUND OF THE INVENTION

Selective emitters are composed of one or more materials that emit more energy, i.e., are more emissive, at certain wavelengths than at other wavelengths at a given temperature. Different materials have different emissive characteristics. In useful applications, selective emitter materials are chosen such that their emissive characteristics are most closely matched to the energy wavelengths necessary to perform a particular task.

For example, selective emitters are used in thermophotovoltaic (TPV) devices, which convert thermal energy emitted within a certain narrow band of wavelengths into electrical energy. The thermal energy is provided by an external heat source, such as solar radiation, combustion, nuclear decay or the like. The selective emitter absorbs broadband energy from the heat source and in turn emits energy within the narrower band at which the TPV device is capable of converting thermal energy to electricity. Other examples of useful applications for selective emitters include infrared dryers, such as those used by paper manufacturers to dry paper, thermometers for measuring high temperatures and the like.

Figure 1:
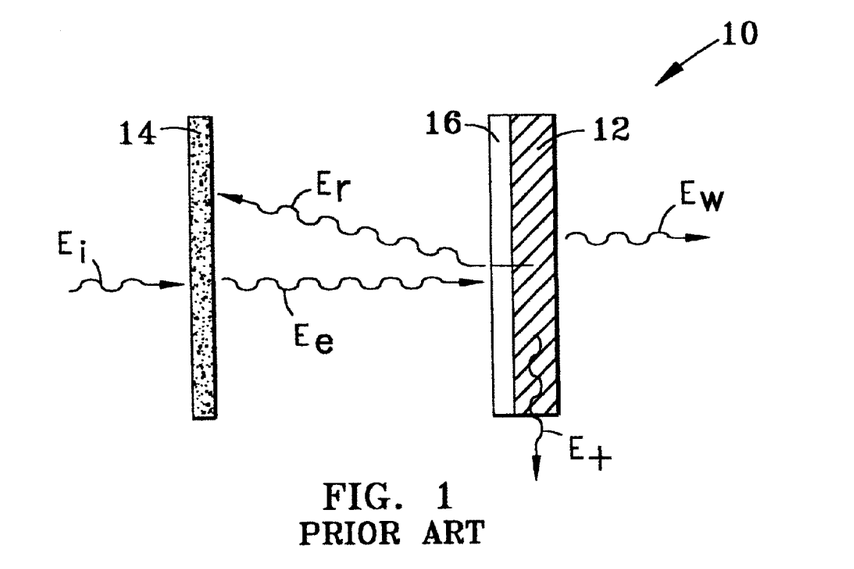
FIG. 1 is a schematic cross-sectional view of a typical prior art thermophotovoltaic electrical generator.

FIG. 1 illustrates a typical TPV device 10, which comprises a photovoltaic (PV) cell 12, an emitter 14 and a filter 16. PV cell 12 is made of any conventional PV material, such as Ge, GaSb, InGaAs, GaInSbAs or the like, which generally operates at wavelengths of about 1 micron to about 2.1 microns. Emitter 14 is made of a material that absorbs incident energy $E_i$ from a heat source (not shown) that heats the emitter to a temperature of 1000 K or more, and emits energy $E_e$ in a desired band of wavelengths narrower than the energy band of incident energy $E_i$. Ideally, the only energy emitted from emitter 14 would be that usable by PV cell 12. However, most materials when heated emit radiation over a very broad spectrum, far beyond the narrow band of the PV material of PV cell 12. Even emitters comprising selective emitters generally emit energy outside of band usable by PV cell.

The energy of wavelengths longer than those utilized by PV cell 12 is wasted infrared energy that reduces the efficiency of TPV device 10. One solution for attenuating the band of unusable energy reaching PV cell 12 is to use an infrared filter, such as filter 16, that reflects energy $E_r$, which contains a large portion of the unusable energy, back toward emitter 14. Of the energy that reaches PV cell 12, the energy within the band of wavelengths usable by the PV cell is transformed into electrical energy $E_t$ and the remaining portion is waste energy $E_w$, which must be removed by cooling the PV cell.

It is known that certain ceramic oxides, when heated to an appropriate temperature, are highly emissive within a narrow band in the infrared spectrum that closely matches the usable energy bands of many PV materials and emit nearly zero energy outside this narrow band. These ceramic oxides include a group of rare earth oxides and a group of refractory metal oxides doped with d-series elements. However, it is impractical to form an emitter made entirely of one or more of these materials due to their fragility. Therefore, it is necessary to form a composite emitter comprising at least one material other than the oxide.

One method of forming a composite emitter is to apply the ceramic oxide selective emitter to a sturdy substrate made of a material other than a ceramic oxide. Typically, the selective emitter and substrate materials have thermal expansion coefficients that are different from one another. This mismatch of thermal expansion coefficients in this embodiment is detrimental to the integrity of the composite structure and often leads to a failure of the bond between the selective emitter layer and the substrate.

U.S. Pat. No. 5,879,473 to Sarraf shows a composite emitter comprising a rare earth selective emitter layer and a sturdy metal substrate. To reduce the likelihood of mechanical failure of the bond between the selective emitter layer and the substrate due to the thermal expansion coefficient mismatch, the composite emitter of the Sarraf patent includes a compliant porous metal powder layer located between the selective emitter layer and the substrate. The selective emitter layer and the porous metal powder layer are hot isostatically pressed onto the metal substrate and are each 2 mm to 3 mm thick. In an alternative embodiment, the composite emitter of the Sarraf patent includes only two layers. The mismatch between the thermal expansion coefficients in this embodiment is accommodated by mixing a gold-plated rare earth selective emitter material in powdered form with a metal powder and pressing the mixture onto a metal substrate to form a combination layer approximately 5 mm thick.

The composite emitters of the Sarraf patent, however, have several disadvantages. First, the relatively thick, i.e., on the order of one or more millimeters, selective emitter layer and compliant intermediate layer of the Sarraf emitters, however, are not desirable due to the large temperature differentials that can develop through these layers. Second, the thick selective emitter layers require more material than necessary and desirable. Third, the hot isostatic bonding process requires that the selective emitter layer be unnecessarily thick. Fourth, to alleviate the thermal expansion coefficient mismatch, a third non-selective-emitter material must be added to the composite emitter.

SUMMARY OF THE INVENTION

In a first aspect, the present invention is directed to a composite emitter comprising a substrate having a first surface and a second surface laterally spaced apart from the first surface. A thermally sprayed layer confronts the first surface of the substrate and comprises a first selective emitter material. A thermally sprayed layer has a thickness ranging from 10 to 400 microns. The substrate and the first selective emitter material are selected so that thermal energy incident to the substrate is in turn emitted such that about 98% or greater of the power emitted from the thermally sprayed layer is in a range of infrared wavelengths greater than 800 nm.

In a second aspect, the present invention is directed to a composite emitter comprising a substrate having a first surface and a second surface laterally spaced apart from the first surface. A reflective metal layer contacts the first surface of the substrate. A thermally sprayed layer contacts one of the second surfaces of the substrate and the reflective metal layer. The thermally sprayed layer comprises a selective emitter material and has a thickness ranging from 10 to 400 microns.

In a third aspect, the present invention is directed to a composite emitter for selectively emitting energy resulting from thermal energy incident to the composite emitter. The composite emitter comprises a substrate having a first surface and a second surface laterally spaced apart from the first surface. A thermally sprayed layer confronts one of the first and second surfaces and has a thickness of about 10 microns to about 400 microns. The thermally sprayed layer consists of a substantially pure ceramic oxide selective emitter material.

In a fourth aspect, the present invention is directed to a method of forming a composite emitter for selectively emitting energy resulting from thermal energy incident to the composite emitter. First, a substrate is provided. The substrate is made of a first material and has a first surface and a second surface laterally spaced apart from the first surface. Next, a layer of a substantially pure ceramic oxide selective emitter material is thermally sprayed onto the substrate such that the layer has a thickness ranging from about 10 microns to about 400 microns.

In a fifth aspect, the present invention is directed to a method of fabricating a composite emitter. First, a substrate is provided. The substrate is made of a first material and has a first surface and a second surface laterally spaced from the first surface. Next, a layer of a selective emitter material is deposited by thermal spraying such that the layer has a thickness ranging from about 10 microns to about 400 microns. The first material and the selective emitter material are selected so that thermal energy incident to the substrate is in turn emitted such that about 98% or greater of the power emitted from the layer of selective emitter material is in range of infrared wavelengths greater than 800 nm.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

DETAILED DESCRIPTION OF THE INVENTION

Figure 2:
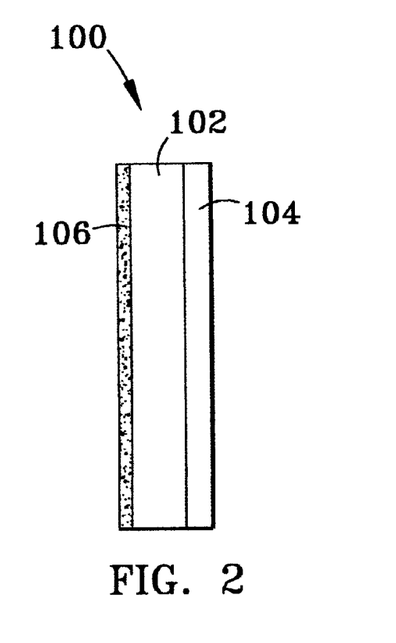
FIG. 2 is a cross-sectional view of a composite emitter according to the present invention.

Referring now to FIG. 2, there is shown a composite emitter, which is denoted generally by the numeral 100. Composite emitter 100 of the present invention is a selective emitter designed to be highly emissive within a narrow range of wavelengths within the energy band usable in a particular application, such as a PV cell (not shown). Outside this usable energy band, the emittance of emitter 100 is low at wavelengths smaller than about 800 nm and between about 2 microns and about 6 microns. Generally, no more than about 2% of the energy incident emitter 100 is emitted at wavelengths less than about 800 nm.

Composite emitter 100 comprises a substrate 102, a selective emitter layer 104 and a reflector layer 106. Substrate is preferably made of a material having a low emittance in the infrared wavelengths below approximately 6 microns and which is capable of withstanding operating temperatures between about 1500 K and about 1900 K. It is presently preferred that substrate 102 be made of either a silicon carbide (SiC) based material, such as SYLRAMIC® S200 CMC (available from Dow Corning Corporation, Midland, Mich.) or a metallic oxide material, such as alumina or yttria. Other materials having low emittance in the desired range, such as quartz and the like, may also be used for substrate 102.

Generally, it is preferred that substrate 102 be as thin as practicable to minimize the temperature gradient across the substrate. For example, for a particular application if substrate 102 is made of a silicon carbide-based material, a relatively strong material, the substrate may be less than 1 mm thick. However, if substrate 102 is made of a metallic oxide that is relatively weak, the substrate for the same application may need to be on the order of several millimeters thick to provide composite emitter 100 with the necessary durability.

Selective emitter layer 104 is made of a material having a high emittance in the band of wavelengths usable in a corresponding TPV or other device with which emitter 100 is designed to be used and very low emittance outside the usable band. Generally, for conventional PV cells, the usable band falls within a range of wavelengths of about 1 micron to about 2.1 microns. Certain ceramic oxide materials, including rare-earth oxides such as erbia, thulia, holmia, dysprosia and ytterbia, and oxides doped with a d-series element, such as cobalt-doped spinel, have desirable emittance characteristics for use with TPV devices and exhibit negligible or no degradation after prolonged exposure to the high operating temperatures characteristic of TPV devices.

Depending on the usable energy band of the corresponding PV cell, one or more selective emitter materials may be mixed with one another in proportions that yield an optimal emittance spectrum. As described below, the thermal spray method of the present invention does not alter the emittance characteristics of the individual ceramic oxide selective emitter materials. Therefore, the spectral emittance characteristics of a combination of two or more selective emitter materials is the composite of the spectral emittance characteristics of the individual materials. Once the characteristics of the individual materials are known, combining two or more materials to optimally match the usable energy band of a TPV device is straightforward.

In addition, two or more selective emitter materials may be applied as separate layers to form a stratified selective emitter layer. Similar to the mixed emitter material embodiment described above, the emissive characteristics of a stratified selective emitter layer is the composite of the emissive characteristics of the individual materials. Regardless of whether one or multiple materials are selected, it is preferred that each of the selective emitter materials be substantially pure, i.e., have a purity of at least 95%.

Selective emitter layer 104 should be provided in a thin layer, e.g., between about 10 microns and about 400 microns, to keep the temperature gradient across the selective emitter layer as low as possible. A thicknesses of at least about 50 microns appears to provide the best emissive characteristics. When multiple layers of different selective emitter materials are used, the total thickness of all such layers should not exceed about 400 microns.

Selective emitter layer 104 is preferably provided such that its in situ density is between about 80% and 95% of the bulk density of the material used. However, other densities may be used. The porosity attendant an in situ density less than the bulk density of the material helps to relieve the mismatch between the thermal expansion coefficients of substrate 102 and selective emitter layer 104 and allows composite emitter 100 to withstand heavy thermal cycling between ambient and operating temperatures.

Selective emitter layer 104 is preferably deposited onto substrate 102 using a thermal spraying technique, such as plasma spraying. Thermal spraying involves supplying the selective emitter material as a precursor powder and heating the powder as it is sprayed onto substrate 102. The inventors have found that thermal spraying does not alter the spectral emission characteristics of the selective emitter materials. Thus, when two or more selective emitter materials are mixed with one another, selective emitter layer 104 has a composite emissivity that displays the characteristics of the indivividual components. In addition, thermal spraying allows selective emitter layer 104 to be applied in the desired thickness quickly compared to other techniques such as chemical vapor deposition (CVD) and sputtering. For example, a 50 micron thick emitter layer can be deposited in about 10 seconds. However, if CVD or sputtering were used, it would typically take about 24 hours to grow a 10 micron layer. Moreover, thermal spraying may be performed in either an ambient atmosphere or an inert environment.

A notable advantage of the thermal spray method is that it may be used to apply a selective emitter layer to a substrate of most any shape. For example, in a PV cell, it may be desirable to have a cylindrical composite emitter surrounding a central heat source, such as a flame produced by burning a combustible gas. To form such a composite emitter, a selective emitter layer could be easily thermally sprayed onto a cylindrical substrate. One skilled in the art will comprehend the variety of shapes of composite emitters that may be formed using the thermal spray method of the present invention.

The presently preferred thermal spray method utilizes a conventional plasma spray apparatus, such as a PRAXAIR® 3720 Plasma System available from Praxair Technology, Inc., Danbury, Conn. Other spray systems, however, may be used. Preferably, the thermal spray system selected should be capable of producing deposited, in situ densities from about 80% to 100% of the bulk density of the precursor powder of the selected selective emitter material.

The process of forming a composite emitter of the present invention is performed as follows. First, a substrate 102 is selected. Substrate may be composed of one of the silicon-based, yttria-based or alumina-based materials mentioned above or may be composed of another material having a relatively low emittance below a wavelength of about 6 microns. The surface of substrate 102 onto which the selective emitter material is to be deposited should preferably have a surface roughness to average particle size of the selective emitter powder ratio of about 1:10 in order to promote good adhesion between selective emitter layer 104 and substrate 102. In a preferred embodiment, the average particle size of the selective emitter material precursor powder is about 20 microns. Thus, the surface roughness of substrate 102 should be about 2 microns root-mean-square.

Ceramic oxide selective emitter materials can be commercially obtained as powders having average particle sizes less than the presently preferred average of 20 microns. For example, rare earth oxide powders typically have an average particle size of 5 microns. In order to obtain the desired 20 micron average size, the smaller particles must be agglomerated into larger particles.

One agglomerating method utilizes a sintering process. First, the smaller particles are sintered in a furnace to form much larger particles, typically on the order of 1000 microns and larger. The sintering is carried out at approximately 80% of the melting point of the ceramic oxide in an air-type high-temperature furnace, which is necessary to keep the oxygen in the ceramic oxide during heating. Vacuum-type high temperature furnaces cannot be used because the oxygen would dissociate from the ceramic oxide.

Following sintering, the very large particles are cooled and pulverized in a ball mill until an optimal portion of the pulverized particles is within a desired range of particle sizes. The pulverized particles are then filtered to obtain the desired range of particle sizes having the desired average particle size, such as 20 microns.

Substrate 102 should be cleaned of substantially all contaminants that would interfere with the adhesion of selective emitter layer 104 to the substrate. An acceptable method of cleaning substrate 102 is to place it into an ultrasonic bath composed of ethanol, preferably for about 15 minutes.

Substrate 102 is then removed from the ethanol bath and dried, preferably using argon gas. If the plasma spraying is not to occur soon after drying, the substrate should be placed into a clean storage container, such as a polyethylene bag. It is noted that handling of uncoated substrate 102 after it is dried should be with a contaminant-free glove, such as a nitrile powder-free glove.

After the drying step or after storage, substrate 102 is placed into a spray fixture that holds the substrate during spraying. Substrate 102 is then typically heated to about 800 K, e.g., with a resistance-type heater for about 10 minutes. The actual temperature depends on the mismatch of the coefficients of thermal expansion between selective emitter layer 104 and substrate 102. Following heating, substrate 102 is sprayed with the desired selective emitter material(s) using a preselected set of system parameters appropriate for the selective emitter material(s) to be applied. The system parameters include particle size of the precursor powder(s), current and voltage supplied to the plasma sprayer, types and pressures of the primary, secondary and carrier gasses, feed hopper speed and distance from the sprayer to the substrate. Presently-preferred spray parameters for the PRAXAIR® 3702 Plasma Spray System are presented below in TABLE 1 for several selective emitter precursor powders. Substrate 102 is preferably coated with the selected material(s) to form selective emitter layer 104 of the desired thickness using a series of vertical passes followed by a series of horizontal passes. Other spray patterns, however, may be used.

TABLE 1

Spray Parameters for Praxair 3702 Plasma Spray System

| Material | Size | Current (Amps) | Primary Gas | Carrier Gas | Hopper Speed (PPM) | Spray Distance (inches) |
|---|---|---|---|---|---|---|
| Erbia | −325 mesh +10 μm | 700 | Argon | Argon | 2.0 | 3.75 |
| Erbia/ Thulia (2:1 mix) | −325 mesh +10 μm/ <10 μm | 700 | Argon | Argon | 2.0 | 4.5 |
| Erbia/ Holmia (3:1 mix) | −325 mesh +10μ/ <10 μm | 700 | Argon | Argon | 1.3 | 4.5 |
| Co-doped Spinel | −325 mesh | 900 | Argon | Argon | 1.0 | 4.5 |

Once the plasma spraying step has been completed and composite emitter 100 has cooled, the composite emitter should be stored in a clean container, such as a polyethylene bag, until it is used. The composite emitter should not be handled until it has cooled to at least about 300 K.

Reflector layer 106 may be optionally provided to enhance the emittance characteristics of composite emitter 100 by blocking energy from the heat source at wavelengths unusable by the PV cell from being transmitted through the composite emitter. Alternatively to providing reflector layer 106, a separate reflector structure may be provided adjacent a composite emitter of the present invention that comprises only substrate 102 and selective emitter layer 104.

If provided, reflector layer 106 is preferably made of a material, such as platinum, that is highly reflective in the infrared energy band. When composite emitter 100 is used, reflector layer 106 faces the heat source and selective emitter layer 104 faces the PV cell. Preferably, reflector layer 106 comprises a thin film applied to substrate 102 by CVD, sputtering or the like. However, reflector layer 106 may alternatively comprise a thin foil sheet bonded to substrate 102 using techniques known in the art. In a preferred embodiment wherein platinum is the reflective material, the desired thickness of reflector layer 106 is about 2 microns. Reflector layer 106 may be provided onto substrate 102 either before or after selective emitter layer 104 is applied to the substrate.

Figure 3:
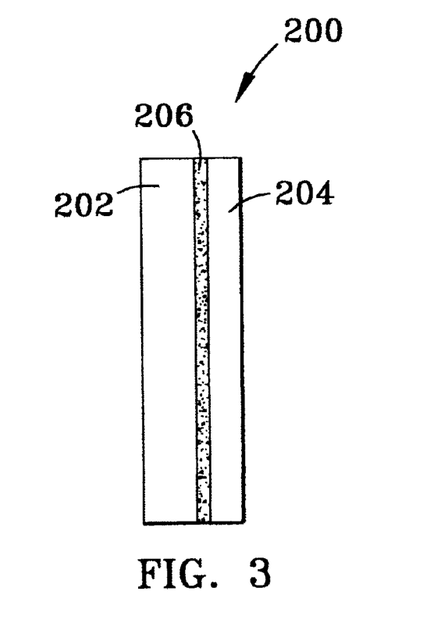
FIG. 3 is a cross-sectional view of an alternative embodiment of a composite emitter according to the present invention.

FIG. 3 shows an alternative embodiment of a composite emitter 200 according to the present invention. Composite emitter 200 comprises the same layers and materials as composite emitter 100. However, the layers are arranged in a different order. In composite emitter 200, reflector layer 206 is applied to substrate 202 in the manner described above with respect to composite emitter 100, and then selective emitter layer 204 is applied to reflector layer 206, preferably using a thermal spray process, such as the above-described plasma spray process. Reflector layer 206 preferably should have a surface roughness to average precursor powder particle size ratio of about 1:10 to promote a good bond between selective emitter layer 204 and substrate 202.

FIGS. 4–7 show spectral emittance graphs of four sample composite emitters made in accordance with the present disclosure, particularly in accordance with the plasma spraying process described above using the spray parameters in TABLE 1. Each of the sample emitters included an approximately 2.5 mm thick 99.5% alumina substrate and a 2 micron thick platinum reflective layer, and was configured according to the embodiment of FIG. 2.

Figure 4:
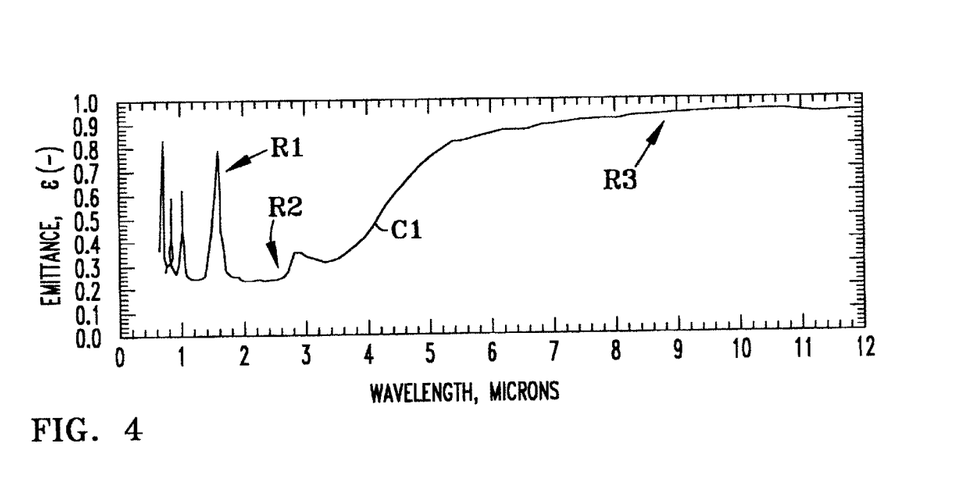
FIG. 4 is a spectral emittance graph at a temperature of 1217 K for the composite emitter shown in FIG. 2 having a 2.5 mm thick alumina substrate, a 50 micron thick erbia selective emitter layer and a 2 micron thick platinum reflector layer.

The composite emitter sample corresponding to the graph of FIG. 4 included a 50 micron thick erbia selective emitter layer and produced spectral emissions curve C1 at a temperature of 1217 K. Curve C1 contains three distinct regions R1, R2 and R3, each of which is characteristic of a corresponding one of the three materials of the composite emitter. Region R1 is dominated by the emittance of the erbia of the selective emitter layer. Region R1 extends from a wavelength of about 0.6 microns to about 1.7 microns and lies within the energy band usable by typical PV cell materials. Region R2 is dominated by the emittance of the platinum of the reflector layer and extends from a wavelength of about 1.7 to about 4 microns. Platinum has an emissivity of about 0.2 from a wavelength of about 0.8 microns to about 10 microns. Region R3 is dominated by the emittance of the alumina of the substrate and extends beyond a wavelength of about 4 microns.

Figure 5:
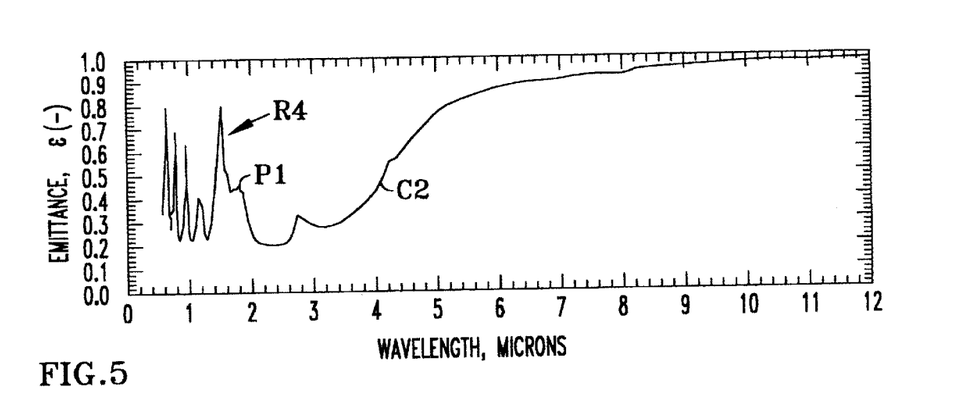
FIG. 5 is a spectral emittance graph at a temperature of 1211 K for the composite emitter shown in FIG. 2 having a 2.5 mm thick alumina substrate, a 50 micron thick erbia and thulia selective emitter layer and a 2 micron thick platinum reflector layer.

Emittance curve C2 of FIG. 5 was generated at a temperature of 1211 K using a composite emitter sample that included a 50 micron thick selective emitter layer containing erbia and thulia mixed together in a ratio of 2:1. In curve C2, region R4 is similar to R1 of curve C1, except that region R4 contains an emittance peak P1 characteristic of the thulia of the selective emitter layer. That the primary difference between region R1 of curve C1 and R4 of curve 2 is emittance peak P1 indicates that the emittance charateristics of the erbia in the erbia-thulia composite are not altered by its mixture with thulia when the mixture is applied by plasma spraying. The presence of the thulia extends region R4 from a wavelength of about 1.7 microns, where region R4 would have ended if the selective emitter layer contained only erbia, to about 2.1 microns.

Figure 6:
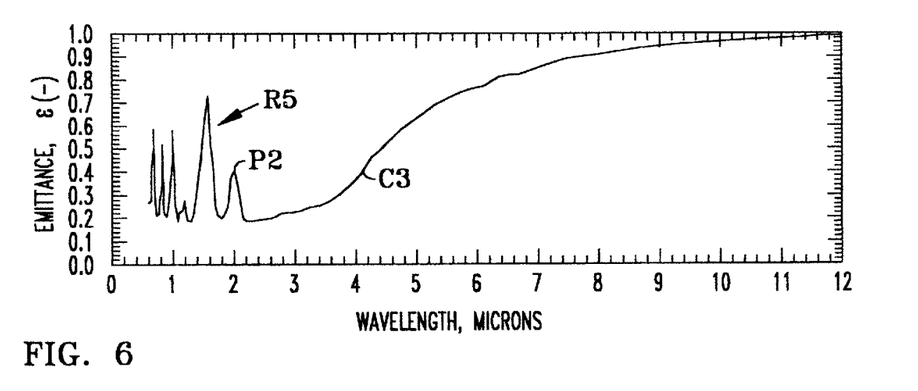
FIG. 6 is a spectral emittance graph at a temperature of 1190 K for the composite emitter shown in FIG. 2 having a 2.54 mm thick alumina substrate, a 100 micron thick erbia and holmia selective emitter layer and a 2 micron thick platinum reflector layer.

FIG. 6 shows an emittance curve C3 generated at a temperature of 1190 K resulting from a composite emitter sample that included a 100 micron thick selective emitter layer containing erbia and holmia mixed together in a ratio of 3:1. Region R5 of C3 is similar to region R1 of curve C1, except for emittance peak P2 in R5 that is characteristic of the holmia present in the composite selective emitter layer. The similarity of the remaining portion of region R5 to the corresponding portions of regions R1 and R4 of FIGS. 4 and 5, respectively, further indicates that the emittance characteristics of the individual selective emitter materials are not altered when mixed with other selective emitter materials and applied by plasma spraying. The presence of the holmia extends region R5 from a wavelength of about 1.7 microns, where region R4 would have ended if the selective emitter layer contained only erbia, to about 2.2 microns.

Figure 7:
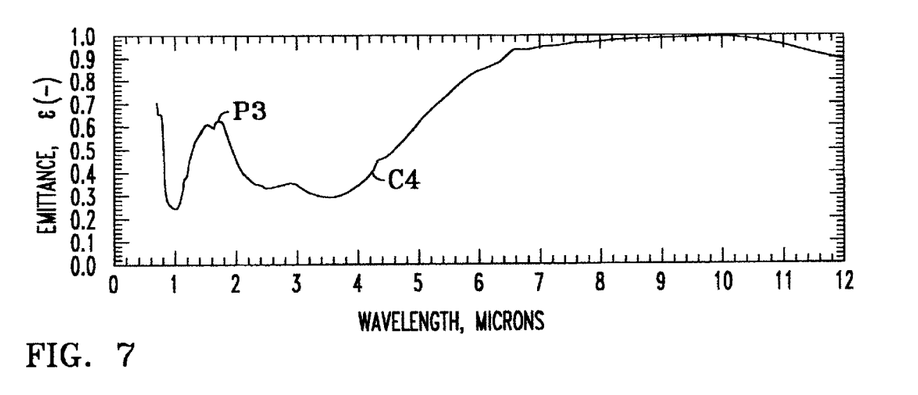
FIG. 7 is a spectral emittance graph at a temperature of 1153 K for the composite emitter shown in FIG. 2 having a 2.5 mm thick alumina substrate, a 200 micron thick cobalt-doped spinel selective emitter layer and a 2 micron thick platinum reflector layer.

FIG. 7 shows an emittance curve C4 generated at a temperature of 1153 K for a sample composite emitter containing a 200 micron thick selective emitter layer made of cobalt-doped spinel. The cobalt-doped spinel produces a relatively wide emittance peak P3 entered at a wavelength of about 1.5 microns.

Although the composite selective emitter of the present invention has been described in connection with a TPV device, it may be used in other applications. For example, one method of drying paper in the paper manufacturing industry is to expose the paper to infrared radiation. This process is most efficient when the infrared energy is contained within a narrow band of wavelengths characteristic of the selective emitter materials described above. In particular, the emittance characteristics of dysprosia are suited to the infrared wavelengths used for paper drying. Thus, a composite emitter of the present invention that includes a dysprosia selective emitter layer either on the side of the heat source facing the paper or as a reflector surface located behind the paper would be desirable to the paper manufacturing industry.

The composite selective emitter of the present invention may also be used in a high-temperature temperature sensor, for example in a fiber optic thermometric system. Ytterbia has an emission peak at about 1 micron that would make it a desirable material for the selective emitter layer of a composite emitter for such a temperature sensor.

While the present invention has been described in connection with a preferred embodiment, it will be understood that it is not so limited. On the contrary, it is intended to cover all alternatives, modifications and equivalents as may be included within the spirit and scope of the invention as defined in the appended claims.

What is claimed is:

1. A composite emitter, comprising:
   a) a substrate having a first surface and a second surface spaced from said first surface; and
   b) a thermally sprayed selective emitter layer confronting said first surface of said substrate, said thermally sprayed selective emitter layer comprising a first selective emitter material and having a thickness ranging from 10 to 400 microns;
   wherein said substrate and said first selective emitter material are chosen so that thermal energy incident to said substrate is in turn emitted from said thermally sprayed selective emitter layer as energy having power such that about 98% or greater of said power is in a range of infrared wavelengths greater than 800 nm.

2. A composite emitter according to claim 1, wherein said first selective emitter material comprises a refractory metal oxide doped with a d-series element.

3. A composite emitter according to claim 2, wherein said first selective emitter material comprises cobalt-doped spinel.

4. A composite emitter according to claim 1, wherein said first selective emitter material comprises a rare earth oxide.

5. A composite emitter according to claim 1, wherein said thermally sprayed selective emitter layer further comprises a second selective emitter material different from said first selective emitter material.

6. A composite emitter according to claim 5, wherein said first and second selective emitter materials are mixed with one another.

7. A composite emitter according to claim 5, wherein said first and second selective emitter materials form separate layers within said thermally sprayed selective emitter layer.

8. A composite emitter according to claim 1, wherein said first selective emitter material has a bulk density and said thermally sprayed layer has an in-situ density of less than 95% of said bulk density.

9. A composite emitter according to claim 1, further comprising a reflective metal layer provided on said second surface of said substrate.

10. A composite emitter according to claim 9, wherein said reflective metal layer comprises platinum.

11. A composite emitter according to claim 1, further comprising a reflective metal layer disposed between said substrate and said thermally sprayed layer.

12. A composite emitter according to claim 1, wherein said first selective emitter material comprises a precursor powder having an average particle size, said first surface of said substrate having an rms roughness equal to about one-tenth of said average particle size.

13. A composite emitter according to claim 1, wherein said thermally sprayed selective emitter layer is a plasma sprayed layer.

14. A composite emitter according to claim 1, wherein said thickness of said thermally sprayed layer is about 50 microns.

15. A composite emitter, comprising:
   a) a substrate having a first surface and a second surface spaced from said first surface;
   b) a reflective metal layer contacting said first surface of said substrate; and
   c) a thermally sprayed selective emitter layer contacting one of said second surface of said substrate and said reflective metal layer, said thermally sprayed selective emitter layer comprising a selective emitter material and having a thickness ranging from 10 to 400 microns.

16. A composite emitter according to claim 15, wherein said thermally sprayed selective emitter layer contacts said second surface of said substrate.

17. A composite emitter according to claim 15, wherein said thermally sprayed selective emitter layer contacts said reflective metal layer.

18. A composite emitter for selectively emitting energy resulting from thermal energy incident to the composite emitter, comprising:
   a) a substrate having a first surface and a second surface spaced from said first surface; and
   b) a thermally sprayed layer confronting one of said first and second surfaces, said thermally sprayed layer having a thickness of about 10 microns to about 250 microns and consisting of a substantially pure ceramic oxide selective emitter material.

19. A composite emitter according to claim 18, wherein said ceramic oxide selective emitter material has a bulk density and said thermally sprayed layer has an in situ density of less than about 95% of said bulk density of said ceramic ode selective emitter material.

20. A composite emitter according to claim 19, wherein said in situ density of said thermally sprayed layer is between about 80% and about 95% of said bulk density.

21. A method of forming a composite emitter for selectively emitting energy resulting from thermal energy incident to the composite emitter, comprising the steps of:
   a) providing a substrate made of a first material and having a first surface and a second surface spaced from said first surface; and
   b) depositing onto said first surface by thermal spraying a layer of a substantially pure ceramic oxide selective emitter material such that said layer has a thickness ranging from about 10 microns to about 400 microns.

22. A method according to claim 21, wherein said ceramic oxide selective emitter material is a rare earth oxide.

23. A method according to claim 21, wherein said ceramic oxide selective emitter material is a refractory metal doped with a d-series element.

24. A method according to claim 21, wherein said ceramic oxide selective emitter material comprises at least two rare-earth oxides that are different from one another.

25. A method according to claim 21, wherein said ceramic oxide selective emitter material is applied by plasma spraying.

26. A method according to claim 21, wherein said ceramic oxide selective emitter is supplied as a precursor powder having an average particle size no greater than about 20 microns.

27. A method according to claim 26, wherein said first surface of said substrate has a surface roughness equal to about one-tenth of said average particle size.

28. A method according to claim 21, further comprising the step of applying to said second surface of said substrate a reflective metal layer.

29. A method according to claim 21, wherein prior to step b) a reflective metal layer is applied to said first surface of said substrate and said ceramic oxide selective emitter material is thermally sprayed onto said reflective metal layer.

30. A method according to claim 21, wherein said ceramic oxide selective emitter material has a bulk density and said in situ density of said thermally sprayed layer is less than about 95% of said bulk density.

31. A method of fabricating a composite emitter, comprising the steps of:
   a) providing a substrate made of a first material, said substrate having a first surface and a second surface spaced from said first surface; and
   b) depositing onto said first surface by thermal spraying a layer of a selective emitter material such that said layer has a thickness ranging from about 10 microns to about 400 microns;
   wherein said first material and said selective emitter material are chosen so that thermal energy incident to said substrate is in turn emitted from said thermally sprayed layer as energy having power such that about 98% or greater of power is in a range of infrared wavelengths greater than 800 nm.

32. A method according to claim 31, wherein said selective emitter material is a rare earth oxide.

33. A method according to claim 31, wherein said selective emitter material is a refractory metal doped with a d-series element.

34. A method according to claim 31, wherein said selective emitter material comprises at least two ceramic oxide materials that are different from one another.

35. A method according to claim 34, wherein said at least two ceramic oxide materials are mixed with one another.

36. A method according to claim 34, wherein said at least two ceramic oxide materials form separate layers.

37. A method according to claim 31, wherein said selective emitter material is applied by plasma spraying.

38. A method according to claim 31, wherein said selective emitter material is supplied as a precursor powder having an average particle size no greater than about 20 microns.

39. A method according to claim 38, wherein said first surface of said substrate has a surface roughness equal to about one tenth of said average particle size.

40. A method according to claim 31, further comprising the step of applying to said second surface of said substrate a reflective metal layer.

41. A method according to claim 31, wherein prior to step b) a reflective metal layer is applied to said first surface of said substrate and said selective emitter material is thermally sprayed onto said reflective metal layer.

42. A method according to claim 31, wherein said selective emitter material is sprayed such that said layer has an in situ density of less than about 95% of the bulk density of said selective emitter material.

* * * * *

UNITED STATES PATENT AND TRADEMARK OFFICE
CERTIFICATE OF CORRECTION

PATENT NO.    : 6,379,789 B1
DATED         : April 30, 2002
INVENTOR(S)   : Crowley et al.

It is certified that error appears in the above-identified patent and that said Letters Patent is hereby corrected as shown below:

Column 10,
Line 39, delete "ode" and substitute therefore -- "oxide" --.

Signed and Sealed this

Second Day of July, 2002

Attest:

Attesting Officer

JAMES E. ROGAN
Director of the United States Patent and Trademark Office